(12) United States Patent
Haeberle et al.

(10) Patent No.: US 8,527,542 B2
(45) Date of Patent: Sep. 3, 2013

(54) GENERATING CONTEXTUAL SUPPORT REQUESTS

(75) Inventors: Tilmann Haeberle, Wiesloch (DE); Lilia Kotchanovskaia, Heidelberg (DE); Zoltan Nagy, Wiesloch (DE); Berthold Wocher, Gaiberg (DE); Juergen Subat, Hockenheim (DE)

(73) Assignee: SAP AG, Walldorf (DE)

( * ) Notice: Subject to any disclaimer, the term of this patent is extended or adjusted under 35 U.S.C. 154(b) by 1639 days.

(21) Appl. No.: 11/322,797

(22) Filed: Dec. 30, 2005

(65) Prior Publication Data

US 2007/0162485 A1    Jul. 12, 2007

(51) Int. Cl.
*G06F 17/30* (2006.01)
*G06F 7/00* (2006.01)

(52) U.S. Cl.
USPC ............. 707/791; 707/793; 707/796; 706/25; 706/31

(58) Field of Classification Search
None
See application file for complete search history.

(56) References Cited

U.S. PATENT DOCUMENTS

| | | | |
|---|---|---|---|
| 6,177,932 B1 | 1/2001 | Galdes et al. | |
| 6,199,068 B1 * | 3/2001 | Carpenter | 707/100 |
| 6,304,893 B1 * | 10/2001 | Gish | 709/203 |
| 6,424,991 B1 * | 7/2002 | Gish | 709/203 |
| 6,434,598 B1 * | 8/2002 | Gish | 709/203 |
| 6,930,695 B1 * | 8/2005 | Pabla | 715/805 |
| 2003/0080988 A1 | 5/2003 | Moran et al. | |
| 2003/0084335 A1 | 5/2003 | Moran et al. | |
| 2003/0189600 A1 * | 10/2003 | Gune et al. | 345/810 |
| 2004/0044987 A1 * | 3/2004 | Kompalli et al. | 717/100 |
| 2004/0230559 A1 * | 11/2004 | Newman et al. | 707/1 |
| 2005/0021847 A1 * | 1/2005 | Rothman et al. | 709/238 |
| 2005/0172243 A1 * | 8/2005 | Pabla | 715/805 |
| 2007/0203712 A1 * | 8/2007 | Sunday et al. | 705/1 |
| 2008/0056476 A1 * | 3/2008 | Pounds et al. | 379/201.01 |

* cited by examiner

*Primary Examiner* — Angelica Ruiz
(74) *Attorney, Agent, or Firm* — Fish & Richardson P.C.

(57) ABSTRACT

User-generated input may be received to initiate a generation of a message associated with an incident of a computing system having a multi-layer architecture that requires support. Thereafter, context data associated with one or more operational parameters may be collected from each of at least two of the layers of the computing system. A message may then be generated on at least a portion of the user-generated input and at least a portion of the collected context data. Related apparatuses, methods, computer program products, and computer systems are also described.

21 Claims, 10 Drawing Sheets

Optimize Requests

① Select Purchase Requests ② Select Rules ③ Select Proposal ④ Create

You can group requests by material or supplier, for example. You can also filter requ[ests] those requests that have a particular total value, for example. To add requests to you selection from the list and click *Add to Work Area*. To proceed to the next step, click Group by [Product ▼] : Filter by [_____] [Go]

| | Product | No. of Requests |
|---|---|---|
| △ ☐ | 1560/930 - Clamp W/R1800 | 2 |
| △ ☐ | 1560/939 - Clamp W/R2200 | 1 |
| △ ☐ | 1740/120 - Spiral casing | 4 |
| △ ☐ | 1740/200 - Spiral shaft | 4 |
| △ ☐ | 2450/079 - Hexagon bolt TXBR-700 | 6 |
| △ ☐ | 2450/080 - Hexagon bolt TXBR-900 | 4 |
| △ ☐ | 2450/081 - Hexagon bolt TXBR-980 | 3 |
| △ ☐ | 3120/110 - Welding gas CSV-1 | 1 |
| △ ☐ | 3180-200 - Welding powder B2 | 1 |
| △ ☐ | 3250-500 - Welding cut wire | 1 |

[Add to Work Area]

Work Area

| | Material | Request | Requester | Date | Quantity | UoM |
|---|---|---|---|---|---|---|
| ☐ | | | | | | |

[Remove from Work Area]

You Can Also
Create
Define Optimization Rules

Search for
[_____] [Search]
Advanced Search

---

Help

Search for
[Value____] [▼]
[Go]  Search Options

My Notes ☐.

Before selecting a product, click on the expanded icon to view all connected requests.

Show Demo - Optimize Requests ☐.
Print Demo - Optimize Requests ☐.

Overview - Optimize Requests
Purchase request optimization enables you to get the best conditions from your suppliers, by analyzing the purchase requests and making a list of recommendations that you can accept or reject.

FAQ ☐.                    More...

Support
Contact your IT support by
Phone  [Request Support]

FIG. 5C

Create Support Request

ⓘ All relevant data needed for analysis of the error has been collected, please add a short description of the error...

Severity [High ▼]   Category [Purchasing - Problem with pricing ▼]

Subject [Price not found in purchase order]

Description

Hi Indira,
in my purchase order occured an error, could you please check it, because our customer expects our response today.

Thanks a lot
Philip

[Send]  [Clear]  [Close]

Incident 50006478  Back  Forward

Status  Open    Requestor  Philip Bishop    Account  Akron    Application  SRM    Subject  Price not found in purchase order

[Save] [Print] [Take Over][Send to SAP][Escalate to ▾][Forward to ▾][Follow-up with ▾]

Main
Assigned Solutions
Perform Analysis
Context Data
Time Reporting
Action Log

Search for [Solutions ▾]
[        ]
[Go]    Search Options

| You Can Also
Create Problem
Collaborate

| Related Documents
Relevant SLA

Incidents Details
| Status           | Open ▾                      |
| Subject          | Price not found in purchase order |
| Category         | Application error ▾          |
| Sub-Category     | User created ▾               |
| Initial Response by | 11/22/2004  10:06am       |
| Resolution by    | 11/24/2004  10:06am          |
| Priority         | High ▾                       |
| Responsible      | Indira Miggs                 |
| Support Group    | Key Users ▾                  |
| Escalated on     |                              |

Requestor
| Company   | Akron                   |
| Name      | Philip Bishop           |
| Telephone | +1 405 632-6659         |
| Email     | philip.bishop@akron.com |

Context data
| Transaction   | Purchase Order |
| Screen        | Overview       |
| Screen Number | 732            |
| Program       | SAP A1S        |
| Release       | 1.0RC1         |
| Unicode?      | Yes            |

← 710

Support Request Message
| Message History | 11/18/2004 Phil Bishop
Description:
Hi Indira,
in my purchase order occured an error, could you please check it, because our customer expects our response today Thanks a lot
Philip |

[Add Message]

GENERATING CONTEXTUAL SUPPORT REQUESTS

TECHNICAL FIELD

The subject matter described herein relates to generation of contextual data in connection with a support request.

BACKGROUND

As enterprise software deployments increase in complexity, the costs for supporting such deployments is additionally increasing (and comprises a large portion of the total cost of ownership of enterprise software). With conventional systems, the support load directly scales up with a number of users. Therefore, there is little, if any, cost savings in large deployments. This lack of cost savings is based, in part, on the fact that such arrangements are often inefficient (e.g., support requests are often not routed to the correct entities), fault-prone (e.g., users often do not adequately describe the situation requiring support and its context), and time-intensive (e.g., the situation requiring support cannot be simulated). Moreover, conventional support processes are often not repeatable as a structured mechanism for symptom description and cause identification, nor do such processes optimally resolve identified errors.

SUMMARY

User-generated input may be receive to initiate a generation of a message associated with an incident of a computing system (e.g., a computing system having a multi-layer architecture) requiring support. Thereafter, context data may be collected that is associated with one or more operational parameters from each of at least two of the layers of the computing system. The message may then be generated based on at least a portion of the user-generated input and at least a portion of the collected context data.

One of the layers of the computing system may be a user interface layer. With such a layer, the context data may characterize factors such as an identification of the user, a session identification, an application identification, a pattern and a floor plan from which the user-generated input was received, a portal role assigned to the user, a work set the user is currently working on, a parameter indicating a geographic locale of the user, an application identification, and information characterizing a view presented to the user immediately prior to the receipt of the user-generated input.

One of the layers of the computing system may be a services layer so that collecting context data may include retrieving service layer data that characterizes metadata of one or more business objects. Such metadata may characterize an operational parameter such as: registered services, data transfer associated with services, and transient messages stored in a message buffer.

In some variations, one of the layers is a business object layer and context data is collected therefrom to characterize the incident. The business object layer data may include, for example, data that characterizes a business object or an application component. Additionally, the business object layer data may characterize a parameter such as called business objects, characteristics of business objects, nodes of business object, definition of available extensions, expected field values, called methods, trace data, data encapsulated in a business object, and logged status information.

One of the layers may also include an application server. This layer may be used to characterize data such as transaction identification information, statistical records, database access statistics, function calls, CPU usage, memory usage, data flow with a database, database response time, agent trace statistics, system trace statistics, operating system, software release version, patch level, and annotations to software.

In an interrelated aspect, user-generated input may be received which is operable to initiate a generation of a message associated with an incident of a computing system requiring support. The computing system may include a multi-layer architecture comprising a user interface layer, a services layer, a business object layer, and an application server. Context data associated with one or more operational parameters may be collected from each of at least two of the layers of the computing system. Additionally, the message based on at least a portion of the user-generated input and at least a portion of the collected context data may be generated.

In another interrelated aspect, an incident message generated in response to and characterizing a monitored change in a state of a multi-layer computing system may be received. Thereafter, context data associated with one or more operational parameters may be collected from each of at least two of the layers of the computing system. A message may then be generated based on at least a portion of the user-generated input and at least a portion of the collected context data.

Computer program products, which may be embodied on computer readable-material, are also described. Such computer program products may include executable instructions that cause a computer system to conduct one or more of the method acts described herein.

Similarly, computer systems are also described that may include a processor and a memory coupled to the processor. The memory may encode one or more programs that cause the processor to perform one or more of the method acts described herein.

The subject matter described herein provides many advantages. By providing intelligent context-specific support, a number of utilized support staff may be reduced and such support staff may have narrowly defined areas of expertise thereby minimizing training costs. Moreover, the subject matter described herein allows for efficient and reliable support processes. The processes are efficient in that they readily identify a cause of an incident or error, assign such incident to an appropriate support person, provide required information to simulate or otherwise diagnose the error situation, and apply an optimal appropriate resolution to the incident. The support processes are repeatable in that previously identified causes and resolutions for incidents, problems or errors may be accessed and applied. In addition, the subject matter described herein may be utilized to develop and organize a knowledge base based on the context specific support requests.

Specifically, the subject matter described herein, depending on the desired implementation allows for one or more of the following advantages: an infrastructure for an end user to address incidents; reduced support for typical usability problems; reduced efforts required to create a service ticket including a required level of detail; provision of diagnostic context data which is time sensitive; simulation of system errors and errors caused by the end user; provision of relevant data from a system/technical layer relating to involved components (e.g., business objects) and a configuration of such layer (e.g., determinations and definition of which determinations are active, how the determinations are configured, and which determination was called by the business object in the certain case); automated and rapid provision of context-specific support solutions including software updates; and the like.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

FIGS. 5A-C illustrate a series of views presented to an end user when initiating an incident message;

FIG. 7 illustrates a second view presented to a key user when handling an incident message.

Like reference symbols in the various drawings indicate like elements.

DETAILED DESCRIPTION

Figure 1:
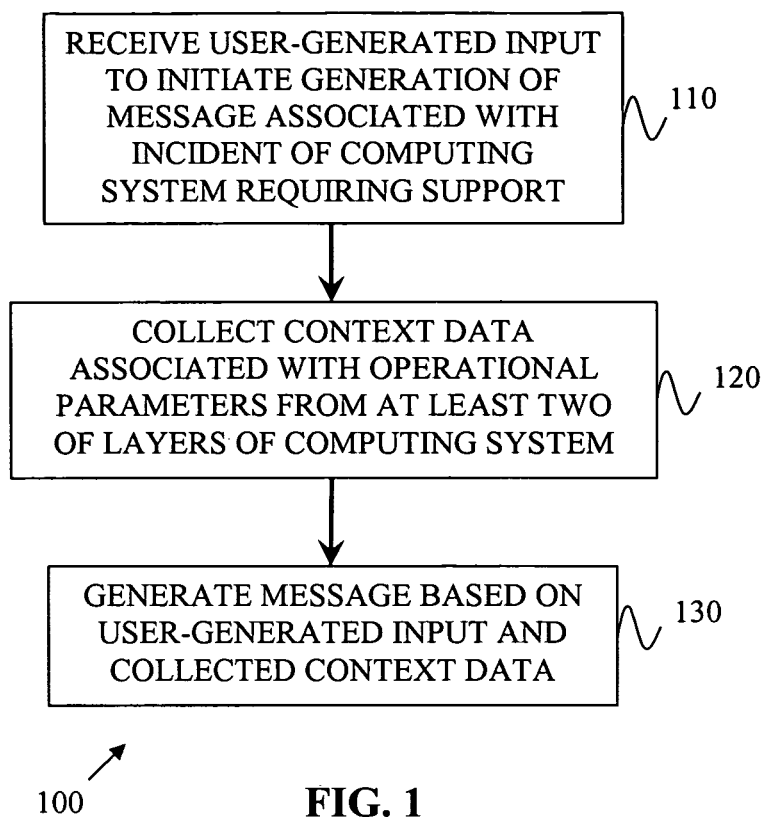
FIG. 1 is a process flow diagram illustrating a method of generating a contextual support request.

FIG. 1 is a process flow diagram illustrating a method 100, in which, at 110, user-generated input is received to initiate a generation of a message. This message is associated with an incident of a multi-layer computing system requiring support. Thereafter, at 120, context data associated with one or more operational parameters is collected from each of at least two of the layers of the computing system. At 130, a message based on at least a portion of the user-generated input and at least a portion of the collected context data is generated.

Figure 2:
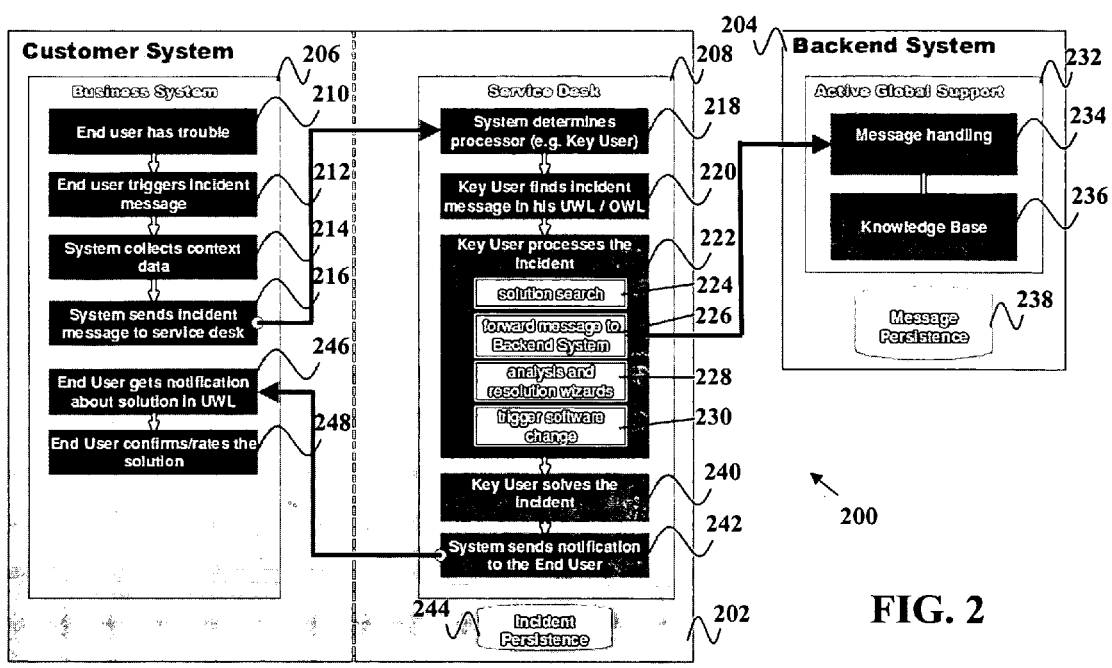
FIG. 2 is a process flow diagram illustrating a method of generating and resolving an incident message.

FIG. 2 illustrates a schematic diagram 200 in which a customer system 202 may interact with a backend system 204. Such interactions may occur, for example, via a communications network (e.g., the Internet, an intranet, a local area network, an Ethernet network, a wireless network, and/or a telephone network, etc.). The customer system 202 may comprise a business system 206 and a service desk 208 that is coupled to the backend system 204. Each of the customer system 202 and the backend system 204 may comprise systems that run software. The software can be a single application or an operating system, or a collection of software applications or software components that perform various tasks in a larger system or application, such as a business application suite, such as customer relationship management (CRM), business administration, financial, manufacturing software, and the like. The business system 206 and service desk 208 may comprise separately deployed systems or a single integrated system.

While utilizing the business system 206, an end user may identify, at 210, an error or other problem with a software application. Thereafter, the end user may, at 212, trigger or otherwise initiate the generation of an incident message. This message may be created, for example, by the end user activating an element within a graphical user interface presented by the software application (e.g., a help button, etc.). Activation of the graphical user interface element may result in a window containing a form prompting the end user to provide information relating to the incident (e.g., a written description and/or categorization of the incident).

After the end user has initiated the generation of the incident message, the business system 206 may, at 214, collect or otherwise obtain context data associated with the state of the software application at the time the end user initiated the generation of the incident message. The context data, may, in some variations, comprise support information from all layers in the architecture. Thereafter, the incident message may be generated by the business system 206. The incident message may contain data associated with the input received from the end user (e.g., a description of the incident as recounted by the end user) as well as the collected context data. After the incident message has been generated, it may, at 216, be sent to the service desk 208.

The service desk 208, upon receiving the incident message, may at 218, determine a key user (e.g., processor) to handle the incident message, based at least in part, on the context data encapsulated in the incident message. The incident message, at 244, may be persisted. Once this determination has been made, the incident message (or data associated therewith) may, at 220, be transmitted to a work list associated with the key user.

The key user may, at 222, process the incident message in any of a variety of ways. In one aspect, the key user may simply manually determine/assign a solution for the incident message. Alternatively, the key user, may, at 224, conduct a search for a solution (e.g., a local search, a search of a remote database, etc.), using, for example, a key word search based on information in the incident message. The service desk 208, may optionally employ, at 228, analysis and/or resolution wizards which present the key user with a series of sequential interrogatories which can be used to identify an appropriate solution or more specifically define the cause of the incident. Additionally, the service desk, 208, may optionally, at 230, initiate the modification of the software application operating on the business system 206 (e.g., sending an update, patch, etc.).

In one optional variation, the incident message may, at 226, be forwarded to the backend system 204. This forwarding to the backend system 204 may be initiated automatically or in response to an input by the key user. The automatic forwarding way be selective based on the contents of the collected data and/or the input from the end user (e.g., forwarding only occurs for certain types of incidents). At the backend system 204, the incident message is processed by a global support system 232. In one variation, the global support system 232 is operable to process a message so that a knowledge base 236 may be polled, at 234, to determine whether there are any known solutions associated with the data encapsulated in the incident message (which may be persisted at 238). In other variations, the global support system 232 routes the received incident message to one or more support users to determine a resolution for the incident message. One or more solutions may be transmitted by the global support system 232 back to the service desk 208 after the knowledge base 236 is accessed (or the support user determines a resolution for the incident message).

The key user may, at 240, initiate a resolution message after the message has been processed. The service desk 208 may then, at 242, send a resolution message to the business system 206. The resolution message may comprise a solution including instructions for the end user to handle or otherwise correct the incident and/or it may comprise a solution including data operable to automatically handle the incident. At 246, the end user may access the resolution message (or data associated therewith) and/or obtain a notification about the solution in his or her worklist. Thereafter, the end user may, at 248, optionally provide feedback regarding the solution (e.g., the end user fills out a customer feedback form).

In some variations, rather than having the end user initiate the incident message, the incident message may be automatically initiated upon a detection of an error or other situation requiring support in the computing system. With such an arrangement, the end user does not, at 212, trigger the incident message. However, the context data may still be collected, at 214, so that the context data is sent to the service desk 208 at 216. The state of the application and/or computing system may be monitored in order to detect any modification of associated parameters that might require support.

The generated solutions may be used to populate a knowledge base data repository. Thereafter, for each new incident message, attributes within the associated context data may be mapped to one or more solutions within the knowledge base data repository. This mapping may occur automatically, or in the alternative, may occur in response to key word searches conducted by the key user.

Figure 3:
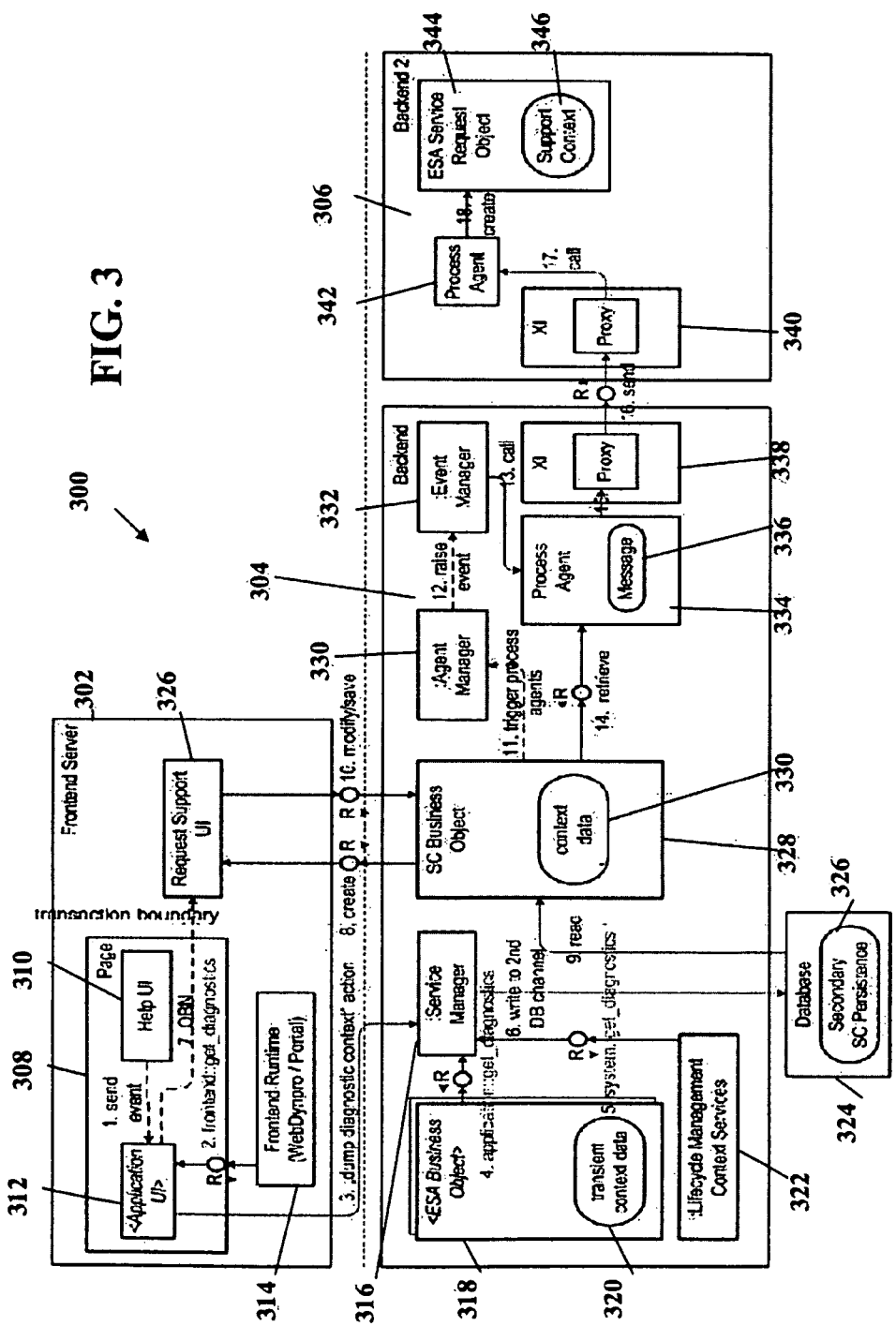
FIG. 3 illustrates a first architecture diagram of a computing system for generating an incident message.
Figure 4:
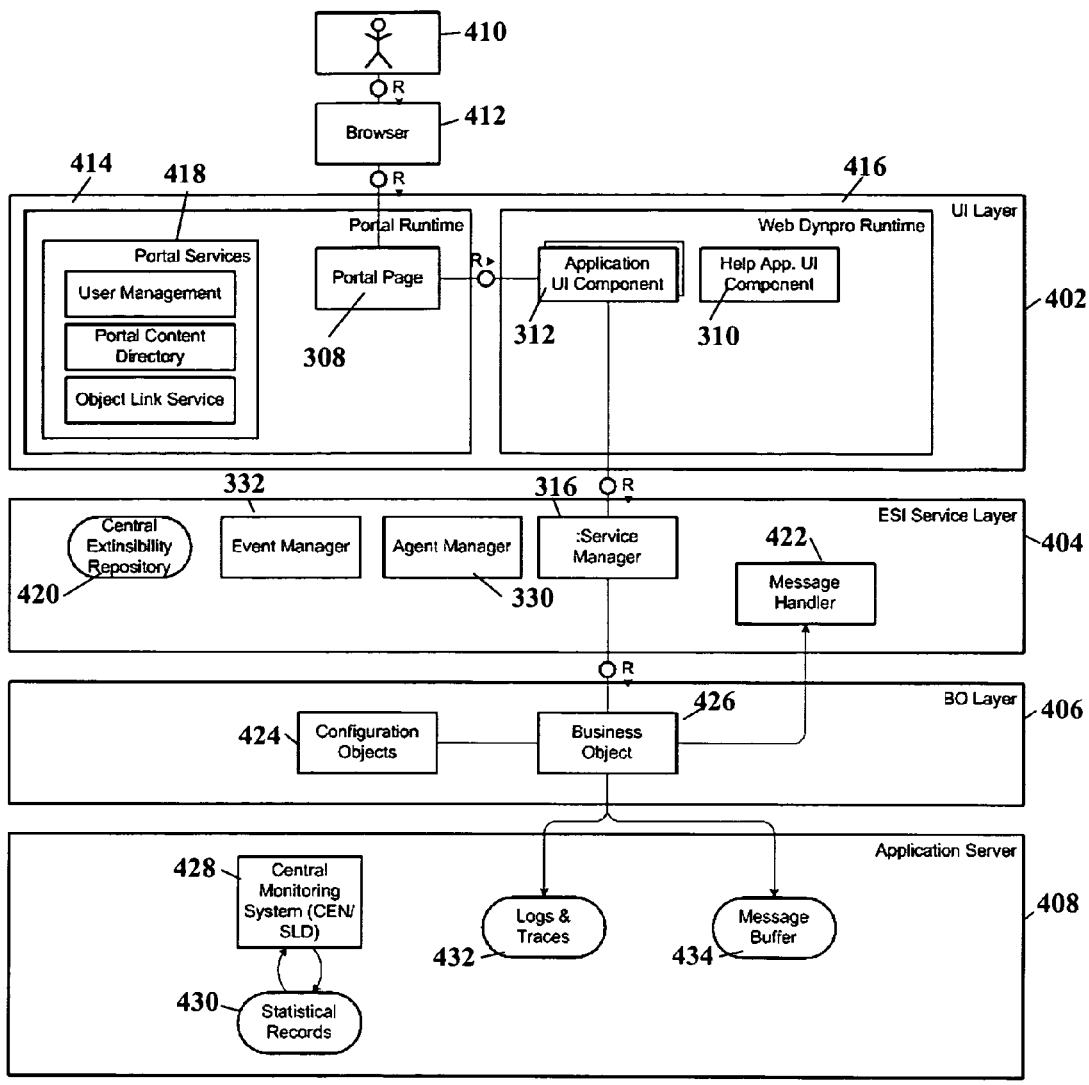
FIG. 4 illustrates a second architecture diagram of the computing system for generating an incident message.

FIG. 3 illustrates a sample architecture 300 of the business system 206 and the service desk 208 comprising a frontend server 302 (which corresponds, to UI layer 402), a first backend 304 (which consists of an ESI Layer 404, a BO layer 406 and an application server 408); and a second backend 306. The second backend 306 may in turn consist of a separate instance of the ESI Layer 404, BO layer 406, and application server 408 (not shown). FIG. 4, which is described below, provides an architecture 400 in which each of the UI layer 402, the ESI Service Layer 404, the BO Layer 406, and the Application Server 408 are delineated.

The following provides a sample process flow which commences with an end user working on a page 308 rendered by a front end server 302. The page 308 may present a help UI 310 in which the end user activates a "Request Support" button. As an alternative, the page 308 may present an application UI 312 in which the user may activate the "Request Support" button directly within an Application UI 312. A client side event is sent (at 1) from the Help UI 310 to the Application UI 312. An event handler within the Application UI 312 receives the event, and starts processing it. The event handler calls (at 2) a frontend::get_diagnostics service from a Frontend Runtime 314 to determine the frontend context, (e.g. role, work center, content of portal fields, etc.). In addition, a support context GUID (SC_GUID) is determined, that will be used for storing and retrieving the support context later.

The event handler triggers (at 3) a "dump diagnostic context" action. The SC_GUID and the frontend context are passed as parameters. The action with its parameters is received by a service manager 316 within the first backend 304. The service manager starts processing the action. The service manager 316 loops (at 4) over all active business objects 320 (transient context data) and retrieves business object specific context information from each business object 318 using an application::get_diagnostics core service.

The service manager 316 collects (at 5) the generic part of the support context (e.g. registered services, technical data, buffer data from the ESI layer, configuration and other environment data). Data from the ESI framework is retrieved within the service manager 316 itself. For obtaining context data from the technical layers, the service manager 316 uses a system::get_diagnostics service from Lifecycle Management Context Services 322.

The service manager 316 (at 6) writes all the context packages collected to a database 324, using a second database channel 326, and commits (on the second database channel—therefore the regular transaction handling for the business objects is not affected). The "dump action" processing is now finished, and control returns to the event handler of the application UI.

The event handler in the Application UI 312 uses (at 7) object based navigation (OBN), to open the request support UI 326 within a new transaction. The SC_GUID is passed as a parameter with the URL that is created by the OBN. The request support UI 326 instantiates (at 8) a new support context business object (SC-BO) 328 encapsulating context data 330, by calling the create core service of the SC-BO 328. The create service receives the SC_GUID. Using the SC_GUID, the implementation of the create core service reads (at 9) the context data from the database 324, extracts the data and builds up the structures of the SC-BO 328.

Relevant data from the SC-BO 328 can be displayed (at 10) in the request support user interface 326 (e.g. a calculated value for the category). The end user enters additional data within the request support UI 326, and then presses the "Send" button. In turn, the save core service of the SC-BO 328 is triggered.

An agent manager 330 is (at 11) triggered by the framework. The agent manager 330 (at 12) raises the appropriate event within an event manager 332 The event manager 332 (at 13) calls the an outbound process agent 334 having a message 336 encapsulated therein for the SC-BO 328.

The outbound process agent 334 uses the SC-BO retrieve core service, to read the support context data 330 (that was built up at 9). The outbound process agent 334 converts the support context data 330 received into an XI message (the SC_MESSAGE). The outbound process agent 334 calls an outbound XI proxy 338 and passes the SC_MESSAGE that was previously created as a parameter. The outbound XI proxy 338 sends the message to the inbound XI proxy 340 of the second backend 306 (e.g., the receiving service desk system 208). The XI proxy 340 in the receiving system 308 identifies the document type and determines which inbound process agent 342 has to be called, in this case a specific one for inbound processing of the support context. This process agent 342 is called (at 17), and the XI message is being passed to the process agent 342.

The process agent 342 extracts the data from the XI message and calls the create core service of the service request business object 344. Part of the data in the SC_MESSAGE is stored directly in the service request (e.g. the user is stored as the partner role "requestor"), all data that has no process relevance or correspondence in the service request business object 344 is stored as a "Support Context" XML attachment 346. At the end of this process chain, the incident is stored as a CRM service request in the service desk system, and can be further processed.

The details of the implementation depend on the type of the specific application UI 326 (e.g., a transactional UI created with Web Dynpro for Java, etc). For a pattern based Web Dynpro application, the help link or support button may be integrated into any floor plan. Sample floor plans include object instance, guided activity, quick activity, and the like. The object instance and guided activity floor plans may have a help link within their object identification pattern, and thus also provide access to the embedded support functionality. With a quick activity floor plan, a support button or link may be integrated therein.

In some variations, a help button/support link may be integrated into an error message (i.e., when an incident error is presented, a help button/support link is also presented). By integrating the help button, the context data includes a reference to the specific error identified in the error message.

The Request Support UI 326 allows the end user to enter a limited amount of additional data to describe the incident, such as priority, a short text entry, a long text description, and the like. Additional entered data may include a category (to be selected from an hierarchical category list), to describe the incident in predefined terms (e.g. hardware—printer; software—Customer Relationship Management—Sales—Pricing). The category should be pre-filled/populated based on the context of the incident (e.g. software—SAP—CRM) and to allow a refinement by the end user (e.g., to select among CRM specific categories, like Pricing, Partner Determination, ATP Check). A telephone number and e-mail address may also be included so that an end user may opt to be notified regarding a resolution of the incident by a telephone call/SMS or e-mail (which alternatively may be derived from data associated with the end user).

The Request Support UI 326 is an application user interface for the Support Context Business Object 328, however it does not display diagnostic information. In addition, the Request Support UI 326 with the Support Context Business Object 328 represents a transaction (running in a new session) which is parallel to the original application transaction (the session to which the <ESA Business Objects 318> belongs to). Therefore, the data can be saved and processed, independently from saving or processing of the original application. Instead of a "Save" button, the Request Support UI 326 provides a "Send" button. When this button is pressed, the save event is triggered on the SC business object 328.

The <ESA Business Objects> 318 denotes all application business objects, which are in memory within the user's application session. These business objects 318 provide the application::get_diagnostics core service, which is called by the service manager 316. With this arrangement, application specific diagnostic data from the user's context may be obtained, such as internal data from the BO layer 406 that is not modeled in the ESI layer 404, such as contents of internal tables, intermediate calculation results, and the like.

The Lifecycle Management Context Services 322 may provide the infrastructure for accessing the runtime context of the technical infrastructure. The system::get_diagnostics core service may be called by the service manager 316 within the user's context to provide diagnostic data from the technical layers in the infrastructure (chapter 4.3.2.4). In some variations, Lifecycle Management Context Services 322 automatically detects all the technical components that have been active during a transaction (e.g. by analyzing the statistical records).

As stated above, the secondary support context persistence is written by the service manager 316 (at 6) to a second database channel. Thus, it is possible to commit the data on the database 324, without having to commit on the original applications. This arrangement enables the saving of the diagnostic context without having to save the applications, which might be undesirable, or impossible due to an inconsistent state of the application, and triggering of several support requests at various stages of the work within a single application transaction. An additional advantage of the secondary support context persistence is that experts can access the diagnostic data using low level tools, even when there are massive problems in the infrastructure that would inhibit normal processing (e.g. object based navigation, or the asynchronous B2B interface which is used to transport the data from the support context business object to the service request in the second backend 306).

The Support Context Business Object 328 is a business object, which is modeled within ESI. It contains all the diagnostic data that is created from the system and application context, when the support process is started. It contains the following: data that can be entered by the end user within the Request Support UI 326; diagnostic data, that is always present (such as generic data from the frontend context, or the ESI layer, or the system layer); data that depends on the business objects that have been in memory; and data that depends on the technical components that have been used (e.g. the IPC, TREX, etc.). Thus, data of such components is only contained in the Support Context Business Object 328, when the respective component has been used.

The Service Request Business Object 344 is a business object that is modeled within the Application Platform. It encapsulates information needed for incident management. The diagnostic data is stored together with the service request in a container, and can be used for inspection, solution search and wizards there.

The context data (also referred to as diagnostic data) may be obtained from the various layers of the architecture of the customer system 208. As stated above, the provision of context data allows for a proper reference for the identified incident and for a structured manner of analyzing the cause of the incident and for determining an appropriate way to resolve the incident.

With reference to FIG. 4, an end or initiating user 410 may utilize a browser 412 to render one or more documents and other applications associated with an enterprise computing system. As indicated above, in connection with supporting errors and other issues associated with the enterprise computing system, context data may be obtained whenever a support request is initiated (whether through an automated process or otherwise).

The context data as used herein may include relevant system and business information from one or more architectural layers: UI layer 402, ESI Service layer 404, BO layer 406 and Application Server 408. The gathered information must support at least one of one of the following use cases: solution search (known error identification/assignment) and wizard's execution (analysis wizards), inspection (error cause identification) with the ability to simulate error situation.

Relevant information may be defined on a layer-by-layer basis and can generally relate to (a) generic data provided by the infrastructure (e.g. statistical records) or a message log; or (b) components specific data defined by each component individually with respect to understanding an error situation and performing error cause identification and resolution thereto (this component specific data is especially relevant for the BO Layer 406).

The UI Layer 402 may consist of the Frontend Runtime 314 which in turn includes a Portal Runtime 414 (in which various portal services 418 such as user management, portal content directory, and object link service may reside) and a Web Dynpro runtime 416. The UI layer of applications may be implemented, for example, using Java. Relevant context data obtained from this layer may include, for example, user data, work center and role definition as well as displayed fields with input data/content.

The UI Layer 402 may obtain data such as a user ID of the end user (e.g., the person creating the incident message). A session ID may also be obtained to determine the session from which the support request has been initiated; a Web Dynpro pattern and floor plan from which the call has been sent. Additionally, a portal role to which the enduser has been assigned may be obtained. This role may be pertinent to the authorizations, worksets the user can see, and the layout of the pages in the portal.

The UI Layer 402 may also obtain information characterizing a work set the end user is currently working in to enable an identification of a screen which is being presented to the end user when initiating the incident message. Some worksets may additionally comprise notes which may be obtained and form part of the context data.

Additional information that may be obtained by the UI Layer 402 include a locale parameter characterizing the browser utilized by the end user, the language the user is logged on, local time, and the like; an application ID of the application UI component(s) that are visible as part of the work set. Furthermore, the context data from the UI layer 402 may provide an intelligent screenshot that contains data that was presented to the end user at the time the incident message was initiated. By providing such information (which may comprise, in some variations, a screenshot of the entire screen/window being presented to the initiating and/or an identification of omitted fields, etc.), a support user may be provided with sufficient data to reproduce the problem, etc.

The ESI Layer 404 may include the service manager 316 and additionally a message handler 422, where internal and external error messages from the application are stored for a certain session. The ESL Layer 404 may also optionally include a central extensibility repository 420. Relevant context data obtained from the ESI Layer 404, includes, for example, registered/called services or process steps in the BO Layer 406.

In ESI Layer 404 all metadata of Business Objects is stored (in terms of process flow, called service, etc.). Therefore the ESI Layer 404 may deliver all generic (as opposed to application component specific) information. This generic information may include all registered services that are called throughout the session by help of the service manager 316. Thereby the service manager 316 collects information about registered services or buffer data from ESI layer 404 as well as all ESI framework information, that is retrieved by the service manager 316 itself. Other context data that may be obtained from the ESI layer 404 includes traces of data flow for the service interface, and data characterizing transient messages in the message handler 422.

The BO Layer 406 is the software layer in which the business objects 426 (and additionally configuration objects 424) are implemented, using, for example, ABAP coding. Relevant context data obtained from the BO Layer 406 include, for example, configuration data or transaction data.

Context data derived from the BO Layer 406 may include called business object(s) which are clearly identified by business object type (e.g., PurchaseOrder) and business object ID. Additional, characteristics of business objects, such as its respective configuration data, may be obtained for the context data. Other characteristics may relate to how a particular business object may be and is used. For example, in the area of "determination", a list of potential determinations in the system, which of these determinations have been activated and how they have been or will be used may also be utilized.

Information regarding available extensions (e.g., including their configurations) may also be obtained from the BO Layer 406; as well as information relating to a system expectation regarding a field value. For example, the system knowing what type of data it expects, therefore can determine valid values that can be entered into a field. Thus, the system has to be able to assess whether or not the entered field value is a valid one or not and should display this accordingly.

Called methods and performed action information may be used to generate the context data. In the BO layer 406, in some variations, only the actual used implemented method of core service operations and the actual performed action is needed. The context data may also comprise data characterizing a trace, recording the actual performed "action" from the beginning of the session upon the time the error occurs is relevant.

Moreover, the context data obtained from the BO layer 406 may include information relating to an affected business object including information about all its business objects nodes (e.g., all elements of such business object which points to a node in the associated data model). With this information, each node can be identified by a key and contains a fix amount of attributes. In addition, information about the associations of the business objects (e.g., directed relationships between business object nodes). Services for navigation on top of the nodes are assigned to the association (which may be a composition or an aggregation association).

Context data may also include BO data as of the time the error/incident occurred. Checkpoint data at critical places in program coding can be used to provide context data that characterizes an internal status of the program (and which may, for example, be written to a log). Rules may be predefined which determine when to classify a situation as critical and what related data to populate in the log.

The Application Server 408 refers to the technical layers of the infrastructure, such as the SAP Web Application Server, J2EE engine, TREX, LiveCache, Portal Infrastructure, BI, XI, JTS, Database Interface, and the like. The Application Server 408 may comprise a central monitoring system 428 for monitoring various operating parameters of applications and for storing such parameters as statistical records 430. Moreover, the Application Server 408 may include a message log 432 that records messages relating to business object 426 and message buffer 434. Relevant context data from the Application Server 408 include, for example, statistical records or system information such as software release and patch level.

The Application Server 408 may provide a transaction ID of the entire transaction throughout the solution (i.e., through all of the technology stacks) so that statistical records 430 may be generated. The statistical records 430 may characterize remote function calls to other components; database accesses; CPU usage; memory usage; data transfer to and from the database 324, database 324 response time, and the like. The context data may also utilize information regarding the agents called from the beginning of a session upon the time the error occurs and the "runtime" of each of these agents (which may be provided by a trace).

Operating system, software release version, patch level and implemented SAPNotes information may also form part of the context data. Such information may be used for both, identifying which bugs already have been fixed and upon which software version error corrections can be applied. Relevant information is gained from the system landscape directory (SLD) and can also be readout via the statistical records.

Figure 5A:
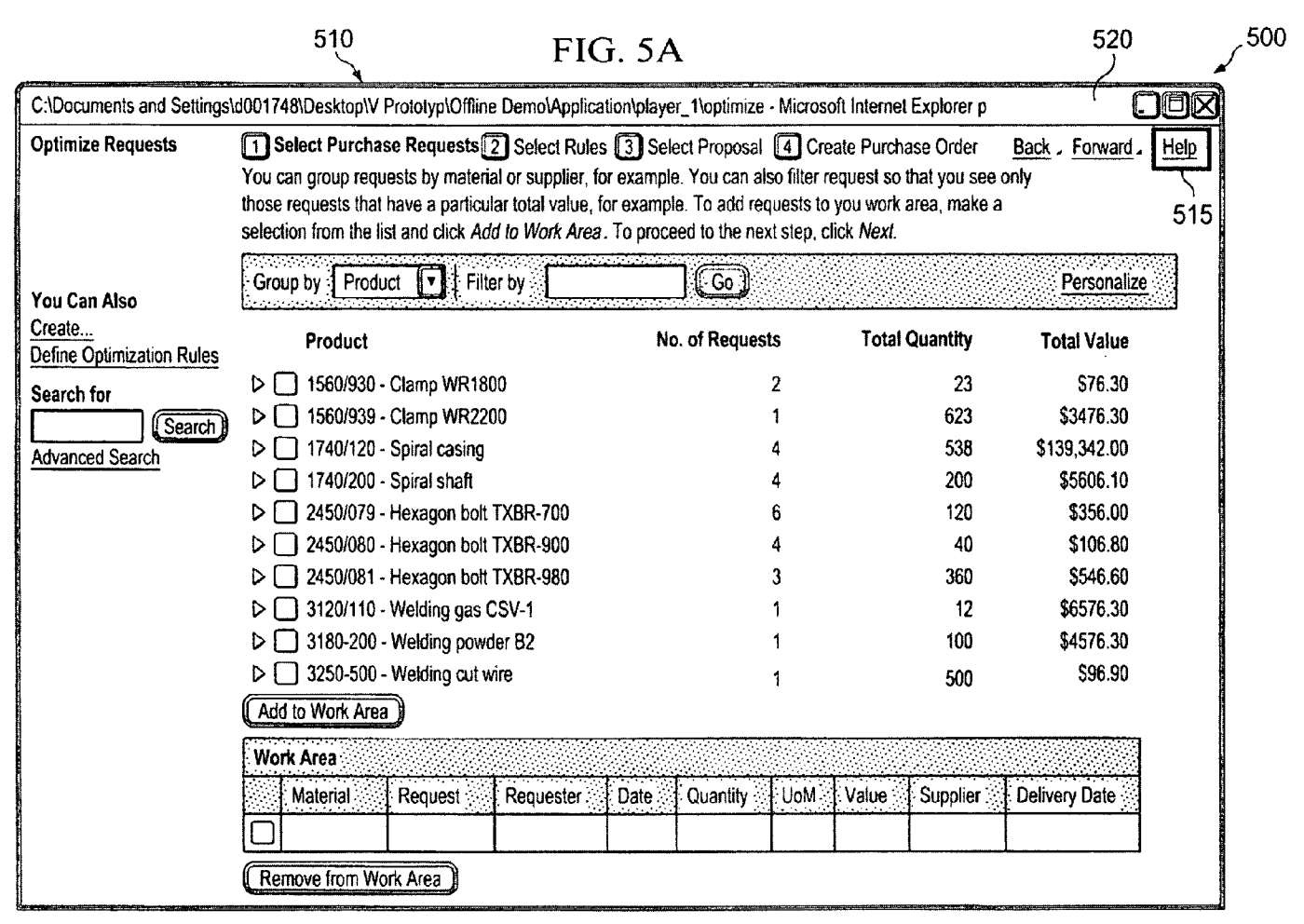

With reference to FIGS. 5A-C, a sample workflow 500 is shown relating to the initiation of an incident message (also referred to as a support request) by an end user. An end user may be presented with a first window 510 that includes various information relating to one or more business transactions, in this case, requesting goods. In one portion of the first window 510, a first graphical user interface element 510 that is labeled "Help". Activation of this first graphical user interface element 510, will cause a second window 530 to open on top of the first window 510. In the second window 530, information may be presented to help the user understand and interact with the subject matter being displayed in the first window 510 (e.g., a knowledge base, links to complementary subject matter, etc.). Within the second window 530, a second graphical user interface element 540 may be, for example, labeled "Request Support". Activation of this second graphical user interface element 540 cause a third window 550 to be displayed. The third window 550 contains one or more input fields/elements 560 (e.g., text box, severity indicator, subject line, category of support request, etc.) which allows the end user to characterize an incident requiring support and to additionally initiate the generation of an incident message.

Figure 6:
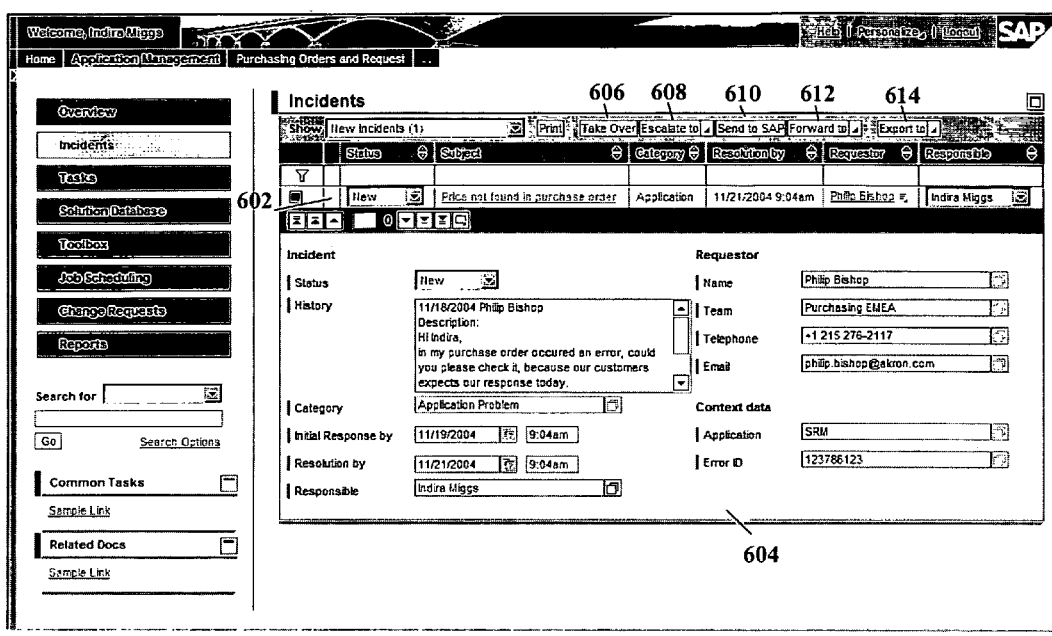
FIG. 6 illustrates a first view presented to a key user when handling an incident message.

FIG. 6 illustrates an interface 600 that might be presented to a key user to which the incident message was assigned. A worklist 602 shows each outstanding incident message that has been routed to the key user. Incident data 604 characterizing the incident message and its current handling status may be displayed. Incident data 604 may include, for example, status, history, category of incident, assigned key user, identification of initiating user, context data, and the like. In addition, the interface 600 may include a series of buttons 606, 608, 610, 612, and 614 which can cause an incident message within the worklist 602 to be reassigned. Activation of a take over button 606 will cause the current key user to take over the displayed incident message (which was assigned to a different key user but was copied to the current key user). Activation of an escalate to button 608 causes the incident message to be reassigned to a more "senior" key user or a more specialized key user. Activation of a send to backend system button 610 causes the incident message to be routed to a backend system which will automatically resolve the incident, suggest solutions to the incident, or route to a support person at the backend system to either resolve directly or suggest a resolution. Activation of a forward to button 612 causes the incident message to be forwarded to another key user (for example, a first key user forwarding to a second key user when his/her shift ends), and an export to button 614 that allows for the exporting of the worklist to another application format.

Figure 8:
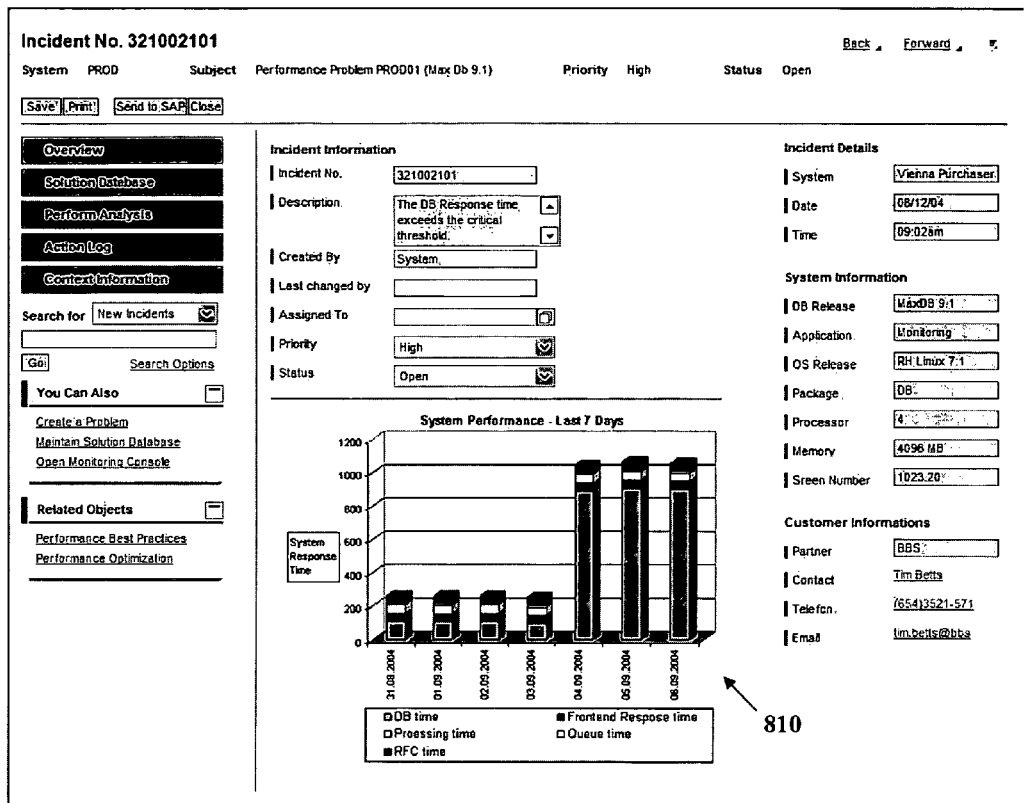
FIG. 8 illustrates a third view presented to a key user when handling an incident message.

Activation of an incident message in the worklist 602 may cause an expanded view 700 (see FIG. 7) of the incident message to be displayed. Additional incident data 710 may be displayed in such an expanded view 700. In particular, additional context data may be presented to the key user, such as transaction identification, screen name, screen number, software program name, software program version, whether the software program supports Unicode, and the like. In addition, in an alternate expanded view 800 (see FIG. 8) of the incident message, may include past performance statistics 810 (which may be aggregated and graphically displayed). These performance statistics 810 may be useful in determining whether a certain incident message relates to typical system behavior or whether they relate to an abnormality.

As soon as an incident message has arrived in the service desk system, it must be processed as efficiently and effectively as possible. Thus the manual steps occurring usually within a service desk system (such as identifying the right processor, classification, prioritization, escalation handling based on service level agreements, etc.) should be automated using a rules engine based on the information that can be provided with the context data. For example, based on the categorization within the context data (e.g. the information "problem has occurred in the SRM application"), an automatic identification of the right service desk employee or key user can be performed (e.g. the "purchasing key user"). In some variations, a database administrator subscribes to all incidents that are caused by database errors. Therefore, the context data must provide enough information to test for the condition "this incident is caused by a database error". This association can be accomplished, for example, by a classification of error messages.

As soon as an incident has been assigned to the key user, and he/she starts to work on the incident, he/she would like to get a quick overview on the situation in which the incident has occurred. By providing the context data to the key user, unnecessary communication between the end user and the key user are avoided thereby reducing an amount of time required to resolve the support issue. In order to allow the key user to understand the context data, it must be presented in human-readable format. This presentation allows for a user to determine, among other things, where did the error occur? (i.e., which screen the end user has been working on); which data has been entered? (i.e., business document number); what was the reaction of the system? (e.g. error messages displayed) and the like.

The key user may quickly identify one or more reasons which caused the error (which in turn caused the end user to generate the incident message). For example, user handling errors often can be spotted immediately by examining the data entered by the end user (e.g., wrong material numbers or space in the wrong places). These are all actions which are straightforward for a human user, but which are difficult to implement absent an exhaustive rule engine.

The key user may also support the end user in understanding error messages and proposing appropriate reactions to resolve the error. Again, an experienced key user that understands the meanings of various message can quickly provide recommendations to the end-user based on the text of the error messages.

In order to address UI issues, the key user may be provided with information (e.g., screenshots) which show what the end user has been seeing on his/her screen. By providing this information in the incident message, the key user does not need to access the computing system using the ID of the end user who might have a different set of authorizations and personalization settings (e.g. fields for the end user are missing on the screen because of a wrong configuration setting) than the key user. In other situations, the key user may require the business object type and business object number to analyze data that is stored in the system to resolve the incident.

In some variations, the context data may be used to conduct an automatic search in a solution database (e.g., SAP Notes, local solution database, or remote solution database at a partner or available online) which may be populated, in part, with solutions to previously generated incident messages. In order to effect such a search, attributes within the context data must be matched or otherwise mapped to attributes in the applicable solution database. Example attributes include the SAP component, that may restrict the search within the solution database, error numbers, program names, field identifiers from the UI and the like. Therefore, only those solutions having matching attributes may be presented to the key user for selection and implementation. If there is only one identified matching solution, it may, in some variations, be implemented automatically.

The context data may also be used to filter out available analysis and correction wizards and tools, that are offered to the key user within the service desk for analyzing or resolving the error. For example, if the functionality "price determination" has been executed within the incidents context, a pricing analysis wizard may be offered to the processor of the incident because the problem might be related to pricing.

Moreover, once a wizard or tool has been selected by the key user, it requires data that it can process. As the key user (or support staff) is working in a different environment than the end user who created the incident, the diagnostic data stored with the incident must be comprehensive enough for the wizards. Thus, a (time consuming and error prone) logon to the customer's system for reproduction of the error can be avoided in many cases. In some cases, interrogatories presented by the wizard may be pre-populated with field values or have pre-selected graphical user interface elements based on the context data. Additionally or in the alternative, one or more of the interrogatories in the wizard may be omitted if the context data can be used to address the problem/step described in one of the interrogatories.

In many cases, the incident is related to errors in the business configuration (e.g., wrong pricing procedure, or route determination). Therefore the context data must contain the relevant data from the business configuration, that allow application consultants (or support experts) to analyze the configuration settings the system has used at the time of the incident, without having to logon to the system.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Although a few variations have been described in detail above, other modifications are possible. For example, the logic flow depicted in the accompanying figures and described herein do not require the particular order shown, or sequential order, to achieve desirable results. Other embodiments may be within the scope of the following claims.

What is claimed is:

1. A computer-implemented method comprising:
receiving user-generated input to initiate a generation of a message associated with an incident of a computing system requiring support, the computing system having a multi-layer architecture;
collecting context data from the computing system requiring support associated with at least one operational parameter from each of at least two of the layers of the computing system, the at least one operational parameter describing a state of the corresponding layer of the computing system at the incident of the computing system requiring support; and
generating the message comprising at least a portion of the user-generated input and at least a portion of the collected context data, the message used to facilitate a resolution to the particular incident of the computing system requiring support.

2. A method as in claim 1, wherein one of the layers of the computing system comprises a user interface layer; and wherein the collecting context data comprises: retrieving user interface layer data from the user interface layer that characterizes the incident.

3. A method as in claim 2, wherein the retrieved user interface layer data is selected from a group comprising: an identification of the user, a session identification, an application identification, a pattern and a floor plan from which the user-generated inpUt was received, a portal role assigned to the user, a work set the user is currently working on, a parameter indicating a geographic locale of the user, an application identification, and information characterizing a view presented to the user immediately prior to the receipt of the user-generated input.

4. A method as in claim 1, wherein one of the layers of the computing system comprises a services layer; and wherein the collecting context data comprises: retrieving service layer data from the services layer that characterizes metadata of at least one business object.

5. A method as in claim 4, wherein the metadata of the at least one business object characterizes a parameter selected from a group comprising: registered services, data transfer associated with services, and transient messages stored in a message buffer.

6. A method as in claim 1, wherein one of the layers of the computing system comprises a business object layer; and wherein the collecting context data comprises: retrieving business object layer data from the business object layer that characterizes the incident.

7. A method as in claim 1, wherein the business object layer data characterizes at least one of a business object and an application component.

8. A method as in claim 7, wherein the business object layer data characterizes a parameter selected from a group comprising: called business objects, characteristics of business objects, nodes of business object, definition of available extensions, expected field values, called methods, trace data, data encapsulated in a business object, and logged status information.

9. A method as in claim 1, wherein one of the layers of the computing system comprises an application server; and wherein the collecting context data comprises: retrieving data from the application server that characterizes the incident.

10. A method as in claim 9, wherein the retrieved application layer data characterizes a parameter selected from a group comprising: transaction identification, statistical records, database access statistics, function calls, CPU usage, memory usage, data flow with a database, database response time, agent trace statistics, system trace statistics, operating system, software release version, patch level, and annotations to software.

11. An article comprising a machine-readable medium storing instructions operable to cause at least one machine to perform operations comprising:
- receiving user-generated input to initiate a generation of a message associated with an incident of a computing system requiring support, the computing system having a multi-layer architecture;
- collecting context data from the computing system requiring support associated with at least one operational parameter from each of at least two of the layers of the computing system, the at least one operational parameter describing a state of the corresponding layer of the computing system at the incident of the computing system requiring support;
- generating the message comprising at least a portion of the user-generated input and at least a portion of the collected context data, the message used to facilitate a resolution to the particular incident of the computing system requiring support; and
- persisting the message for subsequent presentation to a user.

12. An article as in claim 11, wherein one of the layers of the computing system comprises a user interface layer; and wherein the collecting context data comprises: retrieving user interface layer data from the user interface layer that characterizes the incident.

13. An article as in claim 12, wherein the retrieved user interface layer data is selected from a group comprising: an identification of the user, a session identification, an application identification, a pattern and a floor plan from which the user-generated input was received, a portal role assigned to the user, a work set the user is currently working on, a parameter indicating a geographic locale of the user, an application identification, and information characterizing a view presented to the user immediately prior to the receipt of the user-generated input.

14. An article as in claim 11, wherein one of the layers of the computing system comprises a services layer; and wherein the collecting context data comprises: retrieving service layer data from the services layer that characterizes metadata of at least one business object.

15. An article as in claim 14, wherein the metadata of the at least one business object characterizes a parameter selected from a group comprising: registered services, data transfer associated with services, and transient messages stored in a message buffer.

16. An article as in claim 11, wherein one of the layers of the computing system comprises a business object layer; and wherein the collecting context data comprises: retrieving business object layer data from the business object layer that characterizes the incident.

17. An article as in claim 11, wherein the business object layer data characterizes at least one of a business object and an application component.

18. An article as in claim 17, wherein the business object layer data characterizes a parameter selected from a group comprising: called business objects, characteristics of business objects, nodes of business object, definition of available extensions, expected field values, called methods, trace data, data encapsulated in a business object, and logged status information.

19. An article as in claim 11, wherein one of the layers of the computing system comprises an application server; wherein the collecting context data comprises: retrieving data from the application server that characterizes the incident; and wherein the retrieved application layer data characterizes a parameter selected from a group comprising: transaction identification, statistical records, database access statistics, function calls, CPU usage, memory usage, data flow with a database, database response time, agent trace statistics, system trace statistics, operating system, software release version, patch level, and annotations to software.

20. A computer-implemented method comprising:
- receiving user-generated input to initiate a generation of a message associated with an incident of a computing system requiring support, the computing system having a multi-layer architecture comprising a user interface layer, a services layer, a business object layer, and an application server;
- collecting context data from the computing system requiring support associated with at least one operational parameter from each of at least two of the layers of the computing system, the at least one operational parameter describing a state of the corresponding layer of the computing system at the incident of the computing system requiring support; and
- generating the message comprising at least a portion of the user-generated input and at least a portion of the collected context data, the message used to facilitate a resolution to the particular incident of the computing system requiring support.

21. The method as in claim 1, the context data associated with at least one operational parameter from each of at least two of the layers of the computing system collected subsequent to receiving user-generated input to initiate the generation of the message associated with the incident of the computing system requiring support.

* * * * *